(12) United States Patent
Bush et al.

(10) Patent No.: US 9,788,063 B1
(45) Date of Patent: Oct. 10, 2017

(54) VIDEO BROADCASTING WITH GEOLOCATION

(71) Applicant: Google Inc., Mountain View, CA (US)

(72) Inventors: Kathryn Bush, San Francisco, CA (US); Joshua Sassoon, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 5 days.

(21) Appl. No.: 14/142,755

(22) Filed: Dec. 28, 2013

Related U.S. Application Data

(63) Continuation of application No. 13/788,504, filed on Mar. 7, 2013.
(Continued)

(51) Int. Cl.

| | |
|---|---|
| *G06F 3/00* | (2006.01) |
| *G06F 13/00* | (2006.01) |
| *H04N 5/445* | (2011.01) |
| *H04N 21/472* | (2011.01) |
| *H04N 21/482* | (2011.01) |
| *H04N 21/2187* | (2011.01) |
| *H04N 21/266* | (2011.01) |
| *H04N 21/45* | (2011.01) |

(Continued)

(52) U.S. Cl.
CPC ......... *H04N 21/472* (2013.01); *H04N 21/218* (2013.01); *H04N 21/2187* (2013.01); *H04N 21/21805* (2013.01); *H04N 21/266* (2013.01); *H04N 21/431* (2013.01); *H04N 21/4524* (2013.01); *H04N 21/4622* (2013.01); *H04N 21/47202* (2013.01); *H04N 21/482* (2013.01); *H04N 21/632* (2013.01); *H04N 21/8549* (2013.01)

(58) Field of Classification Search
CPC ........... H04N 21/218; H04N 21/21805; H04N 21/2187; H04N 21/4622; H04N 21/472; H04N 21/47202
USPC ............................... 725/37–39, 86, 118, 148
See application file for complete search history.

(56) References Cited

U.S. PATENT DOCUMENTS 8,305,375 B2 * 11/2012 Park et al. .................... 345/418
8,526,985 B2    9/2013 Cilli et al.
(Continued)

OTHER PUBLICATIONS

Office Action for U.S. Appl. No. 13/788,504, Mar. 6, 2015, 14 Pages.
(Continued)

*Primary Examiner* — Jeremy Duffield
(74) *Attorney, Agent, or Firm* — Young Basile Hanlon & MacFarlane, P.C.

(57) ABSTRACT

A video hosting system is provided for storing and managing broadcasts. A user device communicates with the video hosting system to create or join a broadcast. The user device transmits video to the video hosting system for inclusion in the broadcast that may be joined by video transmitted by other user devices. Users of user devices may also search for nearby broadcasts to join. The video hosting system associates a time and place for broadcasts and limits users from joining a broadcast who do not correspond to the time and place of the broadcast. Users of the video hosting system may search for and view videos associated with a broadcast and compile portions of videos associated with a broadcast to create a compilation.

16 Claims, 3 Drawing Sheets

Related U.S. Application Data

(60) Provisional application No. 61/664,003, filed on Jun. 25, 2012.

(51) Int. Cl.
*H04N 21/218* (2011.01)
*H04N 21/63* (2011.01)
*H04N 21/8549* (2011.01)
*H04N 21/431* (2011.01)
*H04N 21/462* (2011.01)

(56) References Cited

U.S. PATENT DOCUMENTS

| | | | |
|---|---|---|---|
| 2001/0003188 A1 | 6/2001 | Kikinis | |
| 2005/0257240 A1 | 11/2005 | Faulkner et al. | |
| 2006/0107294 A1* | 5/2006 | Rivlin | H04N 21/42204 725/80 |
| 2007/0008321 A1 | 1/2007 | Gallagher et al. | |
| 2008/0132251 A1 | 6/2008 | Altman et al. | |
| 2008/0140720 A1 | 6/2008 | Six et al. | |
| 2008/0263235 A1* | 10/2008 | Hans et al. | 710/22 |
| 2009/0055385 A1 | 2/2009 | Jeon et al. | |
| 2009/0063419 A1* | 3/2009 | Nurminen et al. | 707/3 |
| 2009/0125584 A1 | 5/2009 | Agrawala et al. | |
| 2010/0130226 A1 | 5/2010 | Arrasvuori et al. | |
| 2010/0131443 A1 | 5/2010 | Agarwal et al. | |
| 2010/0274816 A1 | 10/2010 | Guzik | |
| 2011/0004591 A1* | 1/2011 | Chen | G06F 17/3087 707/723 |
| 2011/0040760 A1 | 2/2011 | Fleischman et al. | |
| 2012/0027256 A1 | 2/2012 | Kiyohara et al. | |
| 2012/0030282 A1 | 2/2012 | Brody et al. | |
| 2012/0066355 A1 | 3/2012 | Tiwari et al. | |
| 2012/0224021 A1 | 9/2012 | Begeja et al. | |
| 2012/0233000 A1 | 9/2012 | Fisher et al. | |
| 2012/0290953 A1 | 11/2012 | Russell et al. | |
| 2012/0308209 A1 | 12/2012 | Zaletel | |
| 2012/0320013 A1 | 12/2012 | Perez et al. | |
| 2013/0018896 A1 | 1/2013 | Fleischman et al. | |
| 2013/0054693 A1 | 2/2013 | Chennamadhavuni | |
| 2013/0073400 A1 | 3/2013 | Heath | |
| 2013/0102327 A1 | 4/2013 | Mate et al. | |
| 2013/0170819 A1 | 7/2013 | Dykeman et al. | |
| 2013/0173531 A1 | 7/2013 | Rinearson et al. | |
| 2013/0303198 A1 | 11/2013 | Sadasivam et al. | |
| 2013/0337830 A1 | 12/2013 | Haro et al. | |
| 2014/0052738 A1 | 2/2014 | Connell-Giammatteo et al. | |
| 2014/0195625 A1 | 7/2014 | Weldon | |
| 2014/0350970 A1 | 11/2014 | Schumann et al. | |
| 2014/0372436 A1 | 12/2014 | Makki et al. | |

OTHER PUBLICATIONS

"Watch ABD Oscar app enhances, not replaces, TV experience," N Screen Media, Mar. 4, 2014, 5 Pages, [online] [Retrieved on Mar. 12, 2014] Retrieved from the internet <URL:http://www.nscreenmedia.com/watch-abc-oscar-app-enhances-experience/>.

Office Action for U.S. Appl. No. 13/788,504, Feb. 10, 2016, 19 Pages.

Office Action for U.S. Appl. No. 13/788,504, Sep. 8, 2015, 18 Pages.

International Search Report and Written Opinion of the International Searching Authority received for International (PCT) Patent Application No. PCT/US2013/051268 mailed Dec. 23, 2013, 9 Pages.

International Search Report and Written Opinion of the International Searching Authority received for International (PCT) Patent Application No. PCT/US2013/051259 mailed on Dec. 16, 2013, 10 pages.

* cited by examiner

VIDEO BROADCASTING WITH GEOLOCATION

CROSS REFERENCE TO RELATED APPLICATIONS

This application is a continuation application of U.S. patent application Ser. No. 13/788,504, filed Mar. 7, 2013, which claims the benefit of U.S. Provisional Application No. 61/664,003, filed Jun. 25, 2012, each of which is incorporated by reference herein in its entirety.

BACKGROUND

This disclosure generally relates to automatically synchronizing videos in a video repository.

Current video capturing systems allow users to capture and upload individual videos to a video repository. However, users are unable to easily share, tag, capture or edit group footage in real time with other video repository users in the same specific location. A repository user using a mobile device depends on a primary website address, which may not be optimized for mobile device video creation or editing, to upload and share videos.

In addition, video creators must manually enter geographical information post-upload and cannot sync the user's video with other video creators in the same location at the same time. Current systems rely on the tags for a video and user searching to identify videos that are related to one another in location, space and/or time.

SUMMARY

A video hosting service manages video broadcasts in a video repository. A client device uploads videos for storage to a video repository in the video hosting service. The video hosting service associates the video with a geographically-based broadcast. Other users may also join the broadcast and add additional videos to the broadcast. The broadcasts may be viewed and searched by other users, and allows viewers to access broadcasts by others. The broadcasts provide a method for users to share and edit videos about an event such as a concert or protest. The shared videos in the broadcast can be formed into various compilation videos to allow viewers to see various perspectives of the same event.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

Figure 1:
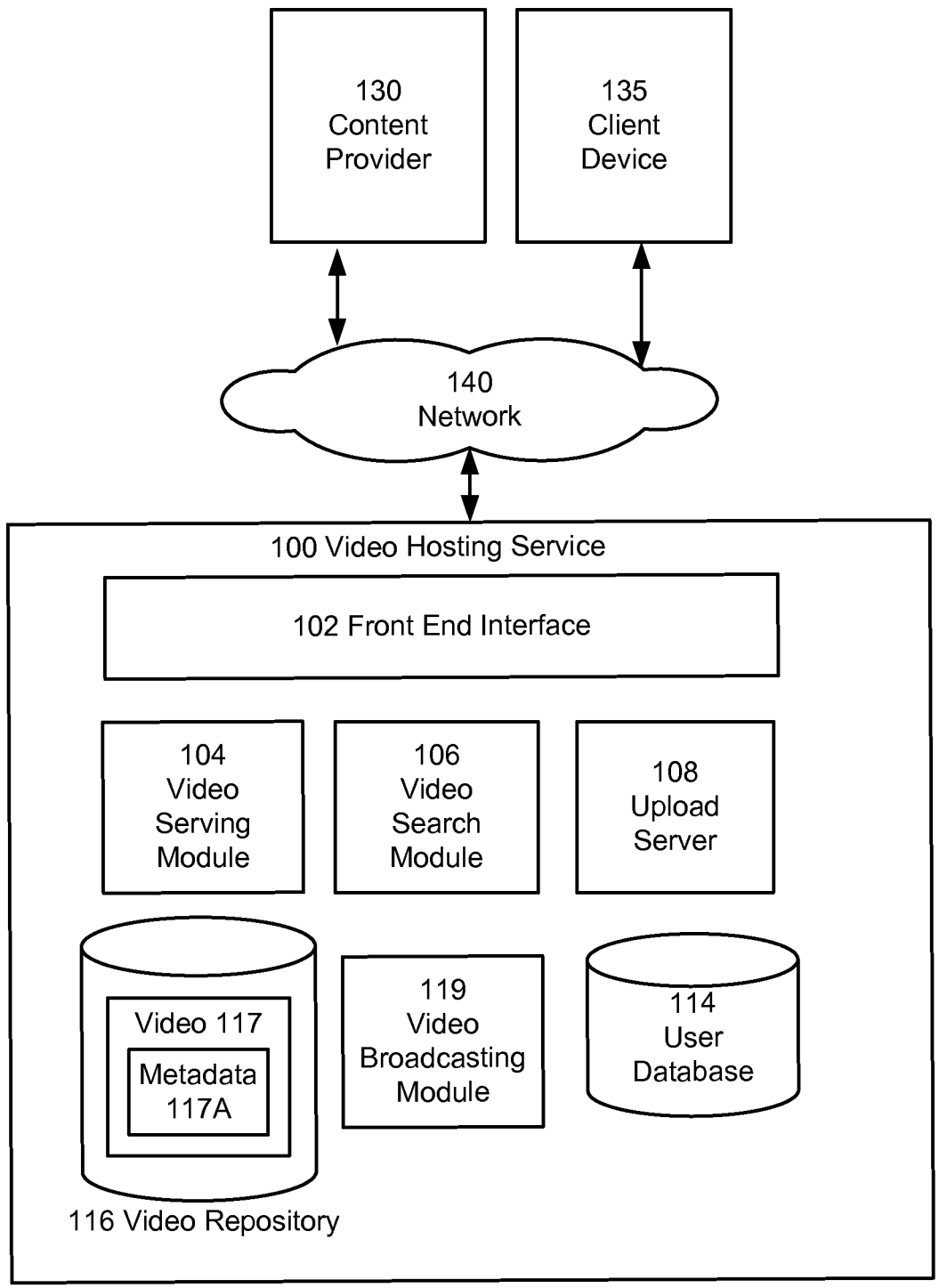
FIG. 1 is a block diagram of a video hosting service in which video broadcasting can be employed according to an embodiment.

FIG. 1 is a block diagram of a video hosting service 100 in which video broadcasting can be employed, according to one embodiment. The video hosting service 100 stores and provides videos to clients such as client device 135. The video hosting site 100 communicates with a plurality of content providers 130 and client devices 135 via a network 140 to facilitate sharing of video content between users. Note that in FIG. 1, for the sake of clarity only one instance of content provider 130 and client 135 is shown, though there could be any number of each. The video hosting service 100 additionally includes a front end interface 102, a video serving module 104, a video search module 106, an upload server 108, a user database 114, and a video repository 116. Other conventional features, such as firewalls, load balancers, authentication servers, application servers, failover servers, site management tools, and so forth are not shown, so as to more clearly illustrate the features of the video hosting site 100. One example of a suitable site 100 is the YouTube website, found at www.youtube.com. Other video hosting sites can be adapted to operate according to the teachings disclosed herein. The illustrated components of the video hosting service 100 can be implemented as single or multiple components of software or hardware. In general, functions described in one embodiment as being performed by one component can also be performed by other components in other embodiments, or by a combination of components. Furthermore, functions described in one embodiment as being performed by components of the video hosting website 100 can also be performed by one or more client devices 135 in other embodiments if appropriate.

Client devices 135 are computing devices that execute client software, e.g., a web browser or built-in client application, to connect to the front end interface 102 of the video hosting service 100 via a network 140 and to display videos. The client device 135 might be, for example, a personal computer, a personal digital assistant, a cellular, mobile, or smart phone, tablet device, recording device with internet connection or a laptop computer.

The network 140 is typically the Internet, but may be any network, including but not limited to a LAN, a MAN, a WAN, a mobile wired or wireless network, a cloud computing network, a private network, or a virtual private network.

Conceptually, the content provider 130 provides video content to the video hosting service 100 and the client 135 views that content. In practice, content providers may also be content viewers. As described below, client devices may be described to provide video content to the video hosting service 100, in which case the client device 135 acts as a content provider 130. Additionally, the content provider 130 may be the same entity that operates the video hosting site 100.

The content provider 130 operates a device, such as client device 135, to perform various content provider functions. Content provider functions may include, for example, uploading a video file to the video hosting website 100, editing a video file stored by the video hosting website 100, or editing content provider preferences associated with a video file.

The client device 135 is a device operating to view video content stored by the video hosting site 100. Client device 135 may also be used to configure viewer preferences related to video content. In some embodiments, the client device 135 includes an embedded video player such as, for example, the FLASH player from Adobe Systems, Inc. or any other player adapted for the video file formats used in the video hosting website 100. Note that the terms "client" and "content provider" as used herein may refer to software providing both client (content viewing) and content providing functionality, to hardware on which the software executes. A "content provider" also includes the entities operating the software and/or hardware, as is apparent from the context in which the terms are used.

The upload server 108 of the video hosting service 100 receives video content from content providers 130. Received content is stored in the video repository 116. In response to requests from client devices 135, a video serving module 104 provides video data from the video repository 116 to the clients 135. Client devicess 135 may also search for videos of interest stored in the video repository 116 using a video search module 106, such as by entering textual queries containing keywords of interest. Front end interface 102 provides the interface between client 135 and the various components of the video hosting service 100.

In some embodiments, the user database 114 is responsible for maintaining a record of registered users of the video hosting server 100. Registered users include content providers 130 and/or users who simply view videos on the video hosting service 100. Each content provider 130 and/or individual user registers account information including login name, electronic mail (e-mail) address and password with the video hosting server 100, and is provided with a unique user ID. This account information is stored in the user database 114.

The video repository 116 contains a set of videos 117 submitted by users. The video repository 116 can contain any number of videos 117, such as tens of thousands or hundreds of millions. Each of the videos 117 has a unique video identifier that distinguishes it from each of the other videos, such as a textual name (e.g., the string "a91qrx8"), an integer, or any other way of uniquely naming a video. The videos 117 can be packaged in various containers such as AVI, MP4, or MOV, and can be encoded using video codecs such as MPEG-2, MPEG-4, WebM, WMV, H.263, H.264, and the like. In addition to their audiovisual content, the videos 117 further have associated metadata 117A, e.g., textual metadata such as a title, description, location, tags, and keywords.

The video hosting service 100 further comprises a video broadcasting module 119 that synchronizes and tags videos provided to video hosting service 100 by a plurality of client devices 135. The client devices 135 may provide video for addition to the video repository 116 in real-time as an event is occurring in the real world. For example, members of a concert, or individuals at a political rally, or fans at a sports game may each capture video of the event. Each client device 135 can create and register the video from the client device as belonging to a particular group of videos relating to that same event. The group of videos is termed a broadcast. The broadcasts are managed by the video broadcasting module 119. Each broadcast is associated with event information describing the event, such as a time, title and a location. The event information allows the user of a client device 135 to search for and identify broadcasts occurring near the user. The video broadcasting module 119 also uses the event information to select broadcasts matching a video captured by a client device 135 and to verify that a video is eligible to join a broadcast.

The video broadcasting module 119 coordinates these activities for video broadcasts and manages data relating to the broadcasts. For example, the video broadcasting module 119 includes information about the event related to each broadcast and the contributors of data and video to the broadcast. The event information may include a location, creator and a timestamp for the broadcast. The timestamp may indicate, for example, the date and time for contribution and contributors of data to a broadcast. The received videos are saved to the video repository 116 and the broadcast data is added to metadata 117A. The broadcast data may also be stored as separate data apart from the metadata associated with each video.

The video can be received by the video broadcasting module 119 in substantially real time via a stream from the client device as the video is captured by the client device, or can be received from the client devices 135 after recording is completed. Real-time receipt of video from the client devices allows the video to be available to other users of the video broadcasting module 119 promptly after the video has been recorded. In addition, real-time receipt of video allows users of client devices to record and save video to the video repository without maintaining a local copy of the video on the client device. By associating the real-time receipt of the video with a broadcast, the video may also be stored and retrieved through the association with the broadcast and may not be separately identified with a user or title in the video repository.

The video broadcasting module 119 receives requests to search for broadcasts according to various event attributes. These attributes may include the event title, time stamp, and location. The search may be performed by a user to view a broadcast or to identify a broadcast to join. When the user uploads a video to associate with a broadcast, the upload includes attributes of the video. The video attributes are compared against the event attributes to verify the video is eligible for addition to the broadcast, such as by ensuring the video corresponds to the time, title and location of the broadcast.

Figure 2:
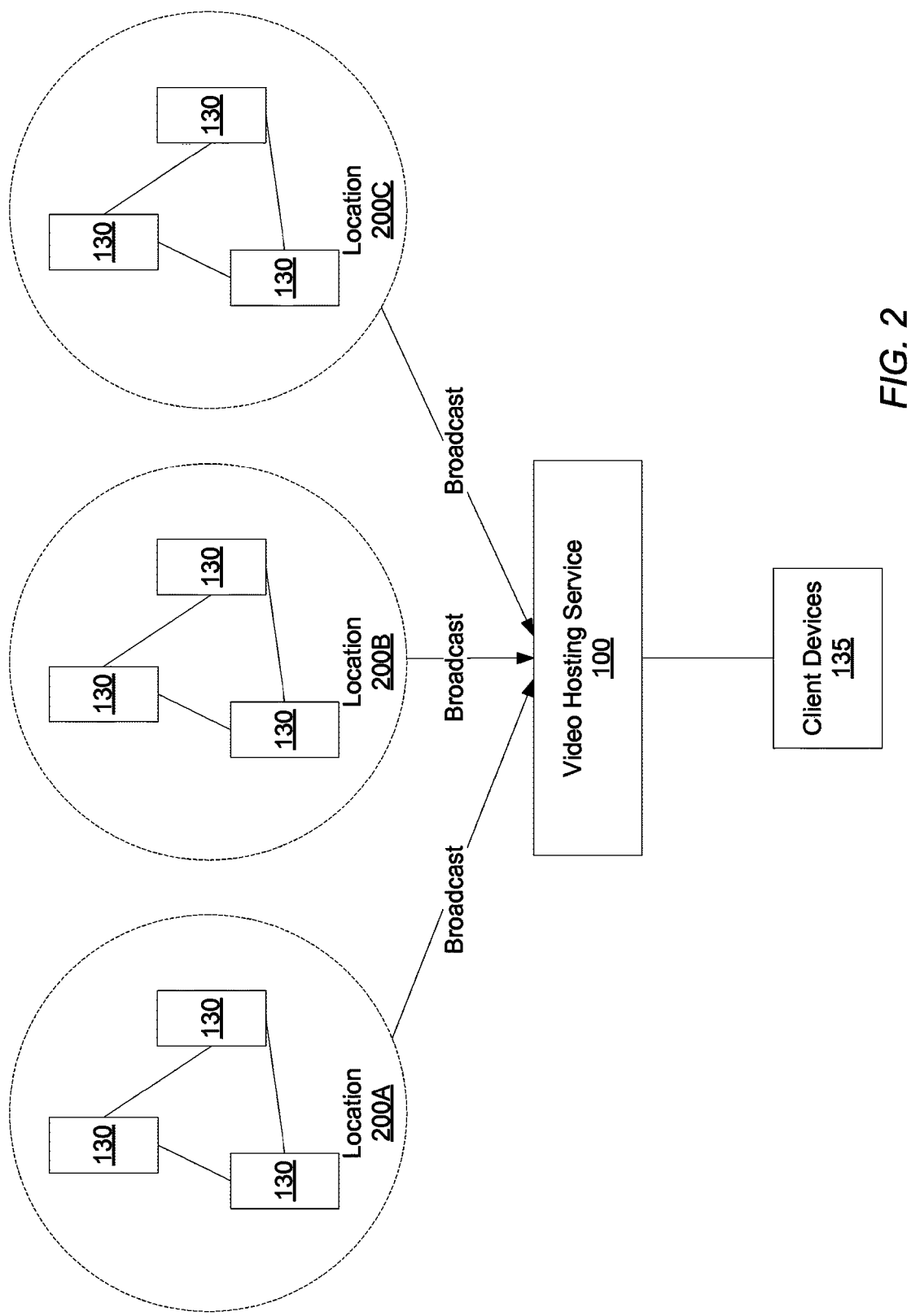
FIG. 2 illustrates a conceptual view of video capture and synchronization with a broadcast according to one embodiment

FIG. 2 illustrates a conceptual view of video capture and synchronization with a broadcast according to one embodiment. Content providers 130 disposed at a location 200 capture video from individual locations. The users of the video repository at each location 200A-C can initiate a new broadcast or join an existing broadcast. The time and geographical location of the broadcast can be tagged by the users or may be automatically identified by the video broadcasting module 119.

Users who have joined a broadcast can view video produced by other members of the broadcast, as well as create a compilation using video from the broadcast. This enables individual users to curate a video stream and select portions of broadcasts from other users to provide into a unitary compilation. For example, users who are located at Tahrir Square in Egypt can join a broadcast and record individual videos associated with the broadcast. The broadcast includes multiple perspectives from the various users of the events at Tahrir Square.

The video from each user as well as the collective broadcast can be transmitted to the video repository 100 and ultimately viewed by client devices 135. The broadcasts and associated video uploaded to the video repository are accessed by these client devices 135. The client devices 135 can search for and identify videos to view using a variety of parameters, such as the title, location, date, event type, uploading user, and other time or space parameters. User devices 135 may also view content from a broadcast. In one embodiment, compilations of video may also be made by user devices 135. In one embodiment, compilations of video may be created only by users who provided video to a broadcast. In other embodiments, users that have not provided video to the broadcast may create compilations. Since broadcasts are typically associated with a particular location 200, client devices 135 are typically disallowed from transmitting video associated with distant, non-associated locations 200A-C.

Figure 3:
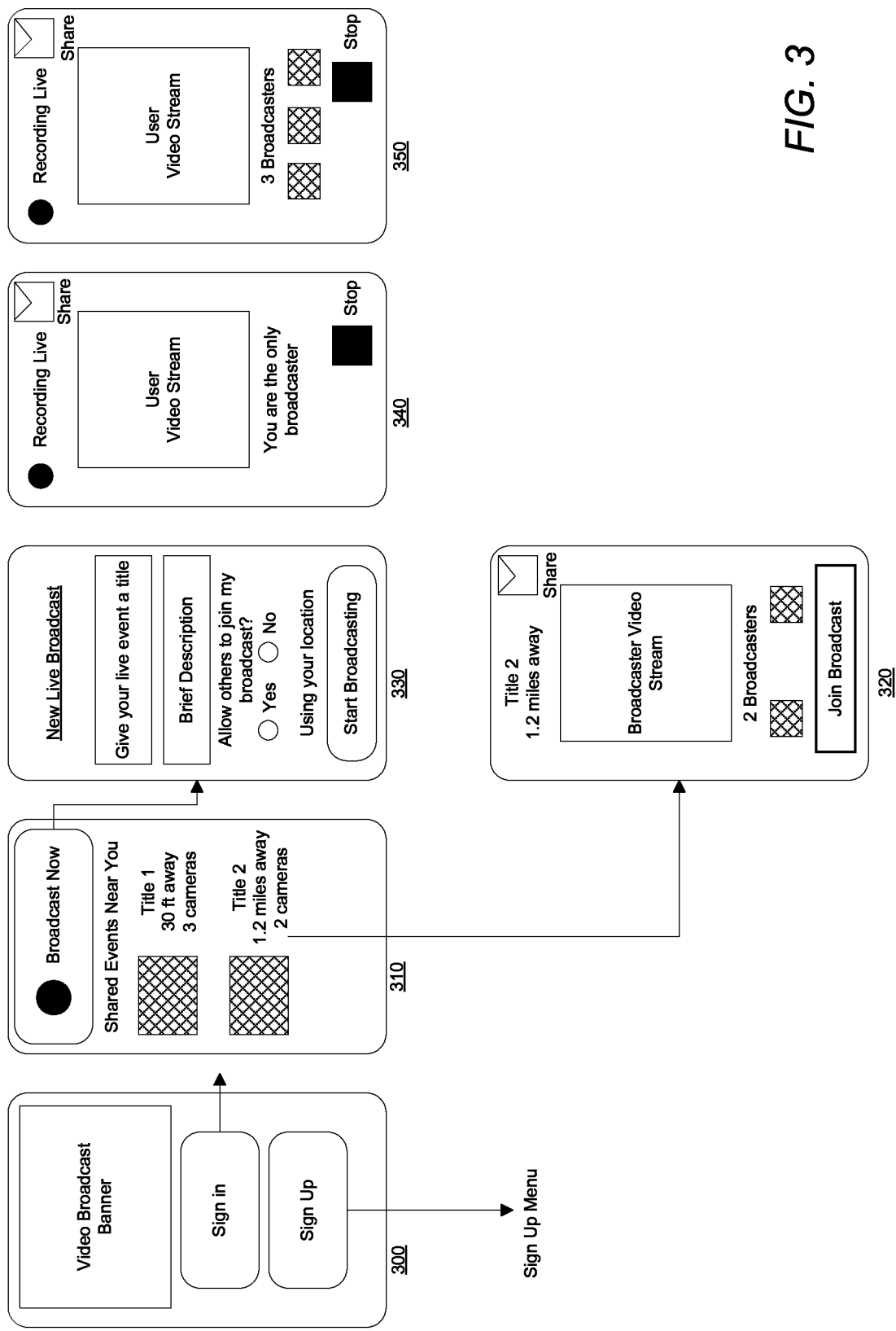
FIG. 3 illustrates an interface on a mobile device for interacting with a video broadcast according to one embodiment.

FIG. 3 illustrates an interface on a mobile device for interacting with a video broadcast according to one embodiment. The application executes on the mobile device and presents the interface to the user of the mobile device. The application provides a method for the user to access and initiate broadcasts, to capture video for a broadcast, and to connect to the video repository. The interfaces shown in FIG. 3 may be a stand-alone application or may be a portion of an application providing broader functionality to access the video repository. An initial screen 300 of the interface provides a banner for the video broadcast system and allows the user to sign in to the video repository system 100. Signing in enables the user's video to be associated with a user's account on the video hosting service 100. In addition, the video interface 300 can provide users with options to sign up for an account with the video repository. In one embodiment, the user is not required to sign in, and the user's video is still provided to the video repository and associated with the broadcast. In various embodiments, a video provided by a user who is not signed in may be associated with the mobile device from which the video was provided, or the video may not be associated with any identifier of an uploading user.

An interface 310 displays options to a user for joining and initiating a broadcast. The interface 310 is presented in one embodiment after the user has logged in. The interface 310 provides a selection of broadcasts near the user device, as well as an option to initiate a new broadcast from that location or within a certain proximity to a location. To obtain the selection of broadcasts, the user device determines the location of the user device, and provides the location of the user device to the video hosting service. The video hosting service provides the request to the video broadcasting module 119 which determines the broadcasts matching the request and provides the matching broadcast selection to the mobile device. The mobile device displays the selection in the interface 310. In another embodiment (not shown), the interface 310 includes fields for the user of the device to input search criteria for identifying broadcasts, such as entering a location other than the mobile device location, a search string for an event title, or to a timeframe from which to identify a broadcast that differs from the current time.

The selection of broadcasts can be provided along with a title and information about the broadcast. Information about the broadcast in one embodiment includes parameters such as the event title, the distance of the broadcast from the mobile device and the number of members also broadcasting in that location, such as "four cameras" or "four recording devices." While shown here in list form, broadcasts can also be viewed on a map. The map interface illustrates a geographic location associated with each broadcast and enables the user to more easily identify the actual physical recording location of the various broadcasters, broadcasting participants can control their visibility on the group map via privacy settings and remain identified or anonymous. After receiving the user's selection of a broadcast to view, the user is provided an interface 320 for viewing the selected broadcast. When the user selects an option to initiate a broadcast, the user is provided a broadcaster interface 330 to enter information about the user's broadcast such as a title and current location.

The interface 320 for viewing a broadcast includes information about the broadcast. The interface 320 includes, but is not limited to, the title of the broadcast, the distance from the user to the originally created broadcast, proximity to other broadcasters recording from within the group, broadcast duration, similar video broadcasts and other relevant location details. The interface 320 provides a main video stream for the user to view the video stream or streams being captured by other users in real-time. Other user views are provided below the video stream and allow the user to select other cameras or broadcasters to view or edit in the main video stream. The user can also elect to join or leave the broadcast. If the user elects to join the broadcast, the system or original creator may further determine whether the user is eligible to join the broadcast. To determine whether the mobile device may contribute to the broadcast, a request to join the broadcast is provided to the video broadcasting module 119. The video broadcasting module 119 determines whether the request is compatible with the requested broadcast. The request is granted when the location, time, and other details of the video to be added to the broadcast match the broadcast event information. Further eligibility to join a broadcast is determined via privacy controls associated with the videos, which may define groups of users permitted or disallowed access and may define specific user-to-user permissions. Certain broadcasts are configured to disallow new users to join, or to prevent joining if the user's location does not sufficiently correspond to the location of the broadcast.

In addition, the interface 320 includes an element for publically or privately sharing the video broadcast or this particular video stream to others. The sharing element may contact persons known and unknown to the user for sharing the broadcast. The sharing options can provide an interface to select others using phone contacts, email addresses, social networking connections, or instant messaging contacts of the user of the mobile device. In addition to inviting users to view the broadcast, the user may also identify contacts to invite to transmit video and join the broadcast. A list of users eligible to join the broadcast may be automatically determined by the video hosting system 100. To determine the list of eligible users, the mobile device provides a contact list, such as other users of the video hosting system 100, to the video broadcasting module 119. The video broadcasting module 119 attempts to determine location information from each user from the contact list. In one example, the location information is be determined from users who are logged in to the video hosting system 100 by querying the device the user is operating to access the system. The location information of the users is matched to the event information of the broadcast to determine if the user is eligible to join the broadcast. In one alternative, rather than receiving location information about the contacts, the system transmits the location information about the broadcast and the contact's mobile device indicates whether the contact belongs to the appropriate geographical area. In this method neither the mobile device of the broadcasting user nor the video hosting system 100 receives location information relating to the users on the contact list.

The interface 320 for viewing a broadcast can also enable the user to view and edit the video feeds of the participating broadcasters to create alternate video configurations. Though not shown in this figure, the editing allows a user to select portions of a video selected from various broadcasters and combine the portions into a uniquely curated and new video compilation. The combined video can be shared to the video repository.

The creator of a video broadcast may also exercise control over which devices or recordings are permitted in the broadcast. For example, the creator (or a manager) of a broadcast may remove video from the broadcast that does not conform to the broadcast location or the creator's editorial intent. For a broadcast of a parade or other gathering, editorial intent may be useful, for example, to remove a video that matches the broadcast's location but records material irrelevant to the gathering.

The interface 330 allows a user to create a new broadcast. The interface 330 provides fields for the user to enter information about the broadcast. The information includes a title, a brief description, and allows the user to confirm and/or authenticate the user's location for broadcast. In addition, the user can select whether to allow other users to join the user in the broadcast. Additional options may be provided to control the privacy settings of the broadcast and select which users are able to join the initial broadcaster and edit, share, and create group video footage. For example, if the mobile device application is connected to a social network or address book of the user, the user can select connections on the social network or connections of the address book that are permitted to view or join the broadcast. After selecting to initiate the broadcast, a request to create the broadcast is transmitted to the video broadcasting module 119. The video broadcasting module 119 registers the broadcast and associates the video captured by the mobile device with the newly registered broadcast. Once the broadcast is registered and video capture is initiated, the user is provided a broadcasting interface 340.

The broadcasting interface 340 is provided to the user to show the content being broadcast by the user and other information about the broadcast. The application activates a video camera and microphone on the user's recording device to capture and broadcast audio and visual information to other users. The visual information captured by the user device is provided in a user video stream element of the interface 340 for presentation to the user. The user video stream element can also be used to display video that is currently being captured as well as video that has previously been captured by a user, such as the original creator or group, within a defined amount of time, such as a day. The interface also includes an option to share the broadcast with others, as well as information about other users who have joined the broadcast. The interface 340 also provides an element allowing the user to stop recording the video and an element to change privacy settings.

In the interface 340, shown, the user of the device is the only camera broadcasting this event. As other users provide additional video to the video broadcasting module 119 for the broadcast, the other users' information and video is added and interface 350 is provided. The interface 350 includes information about other users who have joined the broadcast. The information can be an image or avatar of the joining user, a user name or may be a frame or thumbnail image of the joining user's video feed. Recording users may also suppress identifying information, such as an authenticated user name, to remain anonymous. Such anonymized users may be listed with another anonymized identifier, such as "Recording device #3."

As such, a video creation application is provided that enables real-time group/shared video making from mobile devices, with the option to sync specific groups in specific locations automatically. In one embodiment, a user joining a broadcast does not specifically identify a broadcast to join, but indicates an interest in broadcasting, and the video repository identifies an appropriate broadcast for the user to join based on time and/or the user's location. A broadcast is identified for the user by the video broadcast module 119. The broadcast is identified by determining the user's location and nearby broadcasts to the user's location. The user's location is typically determined using a location service on the mobile device, such as a GPS service or by explicitly 'checking in' to a social network. In addition to location information, the selected broadcast may also be chosen based in part on the user's contacts. For example, the video broadcasting module 119 selects a nearby broadcast with the greatest number of contacts also in the broadcast.

An example use case of these features illustrates the advantages of associating videos in a repository with a common broadcast associated with a time and location. For example, multiple users with mobile devices go to a specific location in the world, such as Tahrir Square in Egypt. The users may log in to an application on their mobile devices and check in to Tahrir Square. These users initiate a broadcast and begin recording live video of the events at Tahrir Square simultaneously and from multiple different camera angles or perspectives (i.e., locations within Tahrir Square). The videos may be uploaded to the video repository in substantially real-time as the events occur or a user may transmit the video to the video repository after a specified delay. The recorded video may be shared, archived, and controlled to determine the extent of public access and publicity of the videos associated with the broadcast. In addition, the users associated with the broadcasts may edit the videos from the various users to create a compilation version of the video that captures the highlights of the event from a variety of perspectives.

The present disclosure has been described in particular detail with respect to one possible embodiment. Those of skill in the art will appreciate that the disclosure may be practiced in other embodiments. First, the particular naming of the components and variables, capitalization of terms, the attributes, data structures, or any other programming or structural aspect is not mandatory or significant, and the mechanisms that implement the disclosure or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present disclosure in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet. Finally, it should be noted that the language used in the specification has been principally selected for readability and instructional purposes, and may not have been selected to delineate or circumscribe the inventive subject matter. Accordingly, the description of the present disclosure is intended to be illustrative, but not limiting, of the scope of the disclosure.

The invention claimed is:

1. A computer-implemented method comprising:
   displaying on a client device a plurality of broadcasts, each of the plurality of broadcasts associated with an event;
   displaying, for each of the plurality of broadcasts, an indication of a number of videos associated with that broadcast and a numerical distance from the client device of where each video is recorded;
   responsive to a first user selection of one of the plurality of broadcasts, displaying on the client device indicators of a plurality of videos stored by a video hosting service and associated with the selected broadcast, each of the plurality of videos capturing at least a portion of the event associated with the selected broadcast; and
   responsive to a second user selection of one of the indicators, displaying the indicated video with one or more additional videos selected from the plurality of videos associated with the selected broadcast on the client device;
   displaying on the client device an option to share the selected broadcast with a contact list of the client device;
   responsive to a third user selection to share the selected broadcast, transmitting a sharing request to the video hosting service with the contact list and an indication of the selected broadcast, wherein the sharing request causes the video hosting service to identify eligible client devices of logged in users indicated in the contact list, the eligible client devices having a location attribute that matches a location attribute of the selected broadcast.

2. The method of claim 1, wherein the plurality of broadcasts are associated with events occurring within a certain distance from a location of the client device.

3. The method of claim 1, wherein the plurality of broadcasts are identified responsive to a query submitted by a user.

4. The method of claim 1, wherein at least one of the plurality of videos is streamed to the video hosting service by an additional client device as the additional client device captures the event.

5. The method of claim 1, wherein displaying the plurality of broadcasts comprises:
   displaying the plurality of broadcasts on a map, the location of each of the plurality of broadcasts within the map based on a geographic location of the event associated with the broadcast.

6. The method of claim 1, wherein the event associated with one of the plurality of broadcasts is a currently occurring event.

7. A non-transitory computer-readable storage medium having computer-executable instructions that configure one or more processors to perform steps comprising:
   displaying on a client device a plurality of broadcasts, each of the plurality of broadcasts associated with an event;
   displaying, for each of the plurality of broadcasts, an indication of a number of videos associated with that broadcast and a numerical distance from the client device of where each video is recorded;
   responsive to a user selection of one of the plurality of broadcasts, displaying on the client device indicators of a plurality of videos stored by a video hosting service and associated with the selected broadcast, each of the plurality of videos capturing at least a portion of the event associated with the selected broadcast; and
   responsive to a user selection of one of the indicators, displaying the indicated video with one or more additional videos selected from the plurality of videos associated with the selected broadcast on the client device;

displaying on the client device an option to share the selected broadcast with a contact list of the client device;

responsive to a third user selection to share the selected broadcast, transmit a sharing request to the video hosting service with the contact list and an indication of the selected broadcast, wherein the sharing request causes the video hosting service to identify eligible client devices of logged in users indicated in the contact list, the eligible client devices having a location attribute that matches a location attribute of the selected broadcast.

8. The computer-readable storage medium of claim 7, wherein the plurality of broadcasts are associated with events occurring within a certain distance from a location of the client device.

9. The computer-readable storage medium of claim 7, wherein at least one of the plurality of videos is streamed to the video hosting service by an additional client device as the additional client device captures the event.

10. The method of claim 1, wherein the indicated video is displayed in real-time as the indicated video is being recorded.

11. The method of claim 1, further comprising:

detecting a selection of one or more video portions of one or more of the plurality of videos;

detecting an indication of a combination of the selected one or more video portions; and wherein the selected one or more video portions are combined in the indicated combination to create a new video compilation.

12. The computer-readable storage medium of claim 7, wherein displaying the plurality of broadcasts comprises:

displaying the plurality of broadcasts on a map, the location of each of the plurality of broadcasts within the map based on a geographic location of the event associated with the broadcast.

13. The computer-readable storage medium of claim 7, wherein the indicated video is displayed in real-time as the indicated video is being recorded.

14. The computer-readable storage medium of claim 7, having further computer-executable instructions to configure the one or more processors to perform steps comprising:

detecting a selection of one or more video portions of one or more of the plurality of videos;

detecting an indication of a combination of the selected one or more video portions; and wherein the selected one or more video portions are combined in the indicated combination to create a new video compilation.

15. The method of claim 1, wherein the sharing request further causes the video hosting service to transmit the selected broadcast to the eligible client devices.

16. The computer-readable storage medium of claim 7, wherein the sharing request further causes the video hosting service to transmit the selected broadcast to the eligible client devices.

\* \* \* \* \*